UNITED STATES PATENT OFFICE.

HERBERT T. KALMUS, OF BROOKLINE, MASSACHUSETTS, ASSIGNOR TO THE EXOLON COMPANY, OF CAMBRIDGE, MASSACHUSETTS, A CORPORATION OF MASSACHUSETTS.

PROCESS OF TREATING NEPHELIN SYENITE.

1,234,905.  Specification of Letters Patent.  Patented July 31, 1917.

No Drawing.  Application filed June 28, 1915.  Serial No. 36,652.

*To all whom it may concern:*

Be it known that I, HERBERT T. KALMUS, a citizen of the United States, residing at Brookline, in the county of Norfolk and State of Massachusetts, have invented certain new and useful Improvements in Processes of Treating Nephelin Syenite; and I do hereby declare the following to be a full, clear, and exact description of the invention, such as will enable others skilled in the art to which it appertains to make and use the same.

This invention relates to a process of treating nephelin syenite. More specifically, the invention relates to a process of making aluminous abrasives from nephelin syenite.

In the manufacture of aluminous abrasives, it has been customary to fuse emery and bauxite with carbon and fluxing material in an electric furnace. The emery and bauxite, forming the basis for the alumina of the abrasive, also contain a large amount of impurities such as silica and iron oxids which may form from 30 to 60 per cent. of the original ore. These impurities are detrimental to the finished product and are removed in the fusion operation by a treatment with fluxing agents and carbon to reduce the impurities to a metallic state. The reduced impurities are not volatile but settle by gravity through the fused mass and the product after cooling is invariably contaminated with segregated reduced impurities. In the above-described process of making abrasives, emeries and bauxites are practically the only available raw materials and the presence of lime, magnesia and titanium oxids in them restricts their use.

The object of the present invention is to produce a process of treating nephelin syenite to make aluminous abrasives, which is not encumbered with complicated furnace reductions and which will produce an abrasive free from the objectionable contaminations referred to. In accordance with this object, one feature of the invention contemplates a process of treating nephelin syenite such that its aluminium content is dissolved, and thereafter precipitated and separated from the solution and then fused in an electric furnace and allowed to cool.

In the preferred form of my invention, the aluminium content of the nephelin syenite is dissolved by sulfitation with sulfur dioxid and water and precipitated from the solution by a fractional desulfitation to separate the aluminium content from the silicon, iron and alkali content. The calcined aluminium content is then placed in an electric furnace and fused, and the fused mass is periodically poured from the furnace in thin streams to quickly cool the product.

My invention also contemplates other features hereinafter described and claimed, the advantages of which will be obvious to those skilled in the art from the following description.

In the process outlined above, nephelin syenite, or other sulfitable aluminium material which consists principally of silicates of aluminium, potassium and sodium, are pulverized and dissolved in a digester. The dissolving operation is carried out by sulfitation with from five to ten times the weight of the silicate, of a two per cent. water solution of sulfur dioxid. In the sulfiting operation most of the aluminium, sodium and potassium contents, and a considerable portion of the silicon content, are dissolved. The mass in the digester containing the insoluble residue is then fractionally desulfited by the introduction of steam. The first part of the desulfitation is carried on until all, or nearly all, of the silica in the solution, is precipitated, and then discontinued. This silica precipitate (which may be silica, silica hydrate, hydrated silica, silicic acid, or any similar compound of silica), together with the insoluble residue, is removed by filtration and the solution is then further desulfited to precipitate the aluminium content. The aluminium content is then filtered from the solution, leaving the sodium and potassium (or alkali) content and possibly a little iron in the solution as comparatively stable sulfites and bisulfites. The aluminium content is precipitated as a basic aluminium sulfite or similar compound, and is preferably dried and calcined at a moderate temperature to drive off the water content along with a certain excess of sulfur dioxid. The resulting product is a white powder containing $SO_3$ varying through wide limits in amount, depending upon the details of treatment, but averaging, as practiced by me, from 15 to 20 per cent. by weight.

This process of treating sulfitable aluminium silicates to recover the aluminium content is described in detail in a patent to Kalmus, Savell & Blake, No. 1,148,092, dated July 27, 1915, to which reference may be had for a detailed description of said method.

The calcined aluminium content, in the form of dehydrated basic aluminium sulfite, is then placed in an electric furnace and fused. During the fusion of the aluminium content, the fused mass is periodically withdrawn from the furnace and poured in thin streams to rapidly cool. The process of treating an aluminous material in an electric furnace and rapidly cooling the product during the fusion is described in my copending application Serial No. 26,626, filed May 7, 1915, for an electric furnace product and the method of making the same, to which reference is hereby made for a detailed description.

The fusion of the aluminium content of nephelin syenite is preferably carried out in an arc-type electric furnace which operates, in part, as an arc furnace and in part as a resister furnace, such, for example, as the furnace specifically described in the British patent to Johnson No. 16,738 of 1896.

It is to be noted that the only impurities, that is, substances other than alumina, supplied to the furnace in practising this method, are volatile materials such as water and compounds of sulfur and oxygen which are evolved during furnace fusion, so that the final product is substantially pure fused crystalline alumina.

While, broadly considered, this invention contemplates the manufacture of aluminous abrasives from nephelin syenite, it is by no means limited to the manufacture of abrasives of substantially pure alumina, as it is desirable in many cases to modify the product by the introduction during the process of certain other constituents. Thus, the process contemplates the addition of magnesium oxid (MgO), titanium oxid ($TiO_2$), silica ($SiO_2$), boric oxid ($B_2O_3$), or beryllia (BeO), or mixtures of these in order to confer upon the final product certain properties which pure alumina does not possess in the desired degree for certain abrasive purposes. To this end the invention contemplates the modification of the final product by the addition of one or more of the above oxids, or mixtures of them, to the aluminium content before it is charged in the electric furnace. From ½ to 5 per cent. of one or more of these oxids may be used for this purpose to confer an abrasive toughness to the final product.

It is within the contemplation of the invention to cool the aluminous product of the furnace in the ordinary way by allowing it to solidify in a large mass, or it may be cooled by tapping the material from the furnace and cooling it in thin streams, in order to modify the crystalline structure of the product. When a coarse-grained crystalline structure is desired, the product may be cooled by allowing it to solidify in a large mass. When a fine-grained crystalline structure of superior abrasive toughness and abrasive hardness is desired, the material may be tapped off in a molten condition and cooled in bodies of small ratio of mass to superficial area.

An important feature of the invention resides in the fact that no fluxing or reducing agents are required to be employed, as a result of which the final product is free from any contamination of these substances or reduction products formed during fusion. Furthermore, it is important to observe that, in practising this method, the temperature at which the fusion is carried on may be kept below the reduction temperature of alumina, so as, therefore, to prevent the formation of reduction products thereof.

Having thus described my invention, what I claim is:—

1. The process of treating nephelin syenite comprising, dissolving the nephelin syenite to recover the aluminium content by precipitation, fusing the aluminium precipitate in an electric furnace, and cooling the fused product to form a crystalline aluminous mass.

2. The process of treating nephelin syenite comprising dissolving the nephelin syenite in an acid solution, separately precipitating the silicon and aluminium contents and removing them from the mass, fusing the aluminium content in an electric furnace, and cooling the fused mass to form a crystalline product.

3. The process of treating nephelin syenite comprising dissolving the nephelin syenite by sulfitation, desulfiting the solution to separate aluminium content, fusing the aluminium content in an electric furnace, and cooling the fused mass to form a crystalline product.

4. The process of treating nephelin syenite comprising dissolving the nephelin syenite by sulfitation, fractionally desulfiting the solution to separate the aluminium content from the silicon content, fusing the aluminium content in an electric furnace, and cooling the fused mass to form a crystalline product.

5. The process of treating nephelin syenite comprising recovering aluminium content from nephelin syenite, calcining it to drive off the volatile constituents, fusing the calcined aluminium content in an electric furnace, and cooling the fused mass to form a crystalline product.

6. The process of treating nephelin syenite comprising recovering aluminium content from nephelin syenite, calcining the aluminium content to drive off the volatile constituents, fusing the calcined aluminium content in an electric furnace, and cooling the fused mass in bodies of small ratio of mass to superficial area to form a product having abrasive toughness, abrasive hardness and fine-grained crystalline structure.

7. The process of making an aluminous abrasive comprising recovering the aluminium content from nephelin syenite, charging the aluminium content in an electric furnace with a mixture of difficultly reducible oxids, fusing the mixture, and cooling the fused mass to form a crystalline product.

8. The process of making an aluminous abrasive comprising recovering aluminium content from nephelin syenite, calcining the aluminium content to drive off the volatile material, charging the calcined aluminium content in a furnace with difficultly reducible oxids, fusing the mixed charge, and cooling the fused mass to form a crystalline product.

HERBERT T. KALMUS.